United States Patent [19]
Moradian

[11] Patent Number: 5,971,118
[45] Date of Patent: Oct. 26, 1999

[54] MOTION DAMPING APPARATUS

[76] Inventor: Norick Moradian, 2120 Eunice St., Berkeley, Calif. 94709

[21] Appl. No.: 08/918,074

[22] Filed: Aug. 25, 1997

[51] Int. Cl.⁶ ....................................................... F16F 9/14
[52] U.S. Cl. .................................. 188/306; 280/124.154; 180/227
[58] Field of Search .................................. 188/306, 266, 188/303; 280/124.145, 124.154, 124.157, 5.52, 286; 180/227

[56] References Cited

U.S. PATENT DOCUMENTS

| | | | |
|---|---|---|---|
| 1,275,460 | 8/1918 | Newberry | 280/124.154 |
| 2,455,431 | 12/1948 | MacGregor | 180/227 |
| 3,731,597 | 5/1973 | Payne | 92/120 |
| 4,236,726 | 12/1980 | Henter, Jr. | 280/124.154 |
| 4,444,406 | 4/1984 | Isono | 280/124.145 |

*Primary Examiner*—Robert J. Oberleitner
*Assistant Examiner*—Pamela J. Lipka
*Attorney, Agent, or Firm*—Thomas R. Lampe

[57] ABSTRACT

Apparatus for connection to relatively moveable first and second structural members to damp such relative movement. The damper apparatus includes a damper housing defining a curved damper housing interior for attachment to a first structural member and a curved damper element for attachment to a second structural member and moveable within the curved damper housing interior along a curved path of movement.

7 Claims, 10 Drawing Sheets

MOTION DAMPING APPARATUS

TECHNICAL FIELD

This invention relates to motion damping apparatus for damping motion between two structural members mounted for relative movement. The invention has application, for example, as a vehicle shock absorber.

BACKGROUND OF THE INVENTION

Shock absorbers and other forms of damper mechanisms employing pistons or equivalent structural elements movable within the interior of a housing and employing oil or gas as damping medium are well known devices. In such arrangements the piston or equivalent damper element moves along a substantially straight line within the interior of the housing during operation of the mechanism. That is, the damper housing interior has a substantially straight, elongated axis along which the damper element, such as a piston head and piston shaft, moves linearly when the device performs its damping or shock absorbing functions.

With respect to the use of such devices on vehicle suspension systems wherein a wheel support moves about a pivot relative to a vehicle frame, such prior art construction has serious drawbacks. These will be discussed in more detail below with respect to both automotive and motorcycle applications. However, it will be appreciated that the teachings of the present invention are applicable for use with structures other than vehicles.

DISCLOSURE OF INVENTION

The present invention relates to apparatus which remedies certain deficiencies of prior art damping and shock absorbing systems wherein there is relative non-linear or angular movement of the components thereof along a linear path of movement during relative movement of two structural members with which the apparatus is associated.

According to the teachings of the present invention, first and second structural members are mounted for relative movement.

Damper means is connected to and extends between the first structural member and the second structural member for damping relative movement between the first and second structural members. The damper means comprises a damper housing defining a curved damper housing interior attached to the first structural member and a curved damper element attached to the second structural member and movable within the curved damper housing interior along a curved path of movement.

Other features, advantages, and objects of the present invention will become apparent with reference to the following description and accompanying drawings.

MODES FOR CARRYING OUT THE INVENTION

Figure 1A:
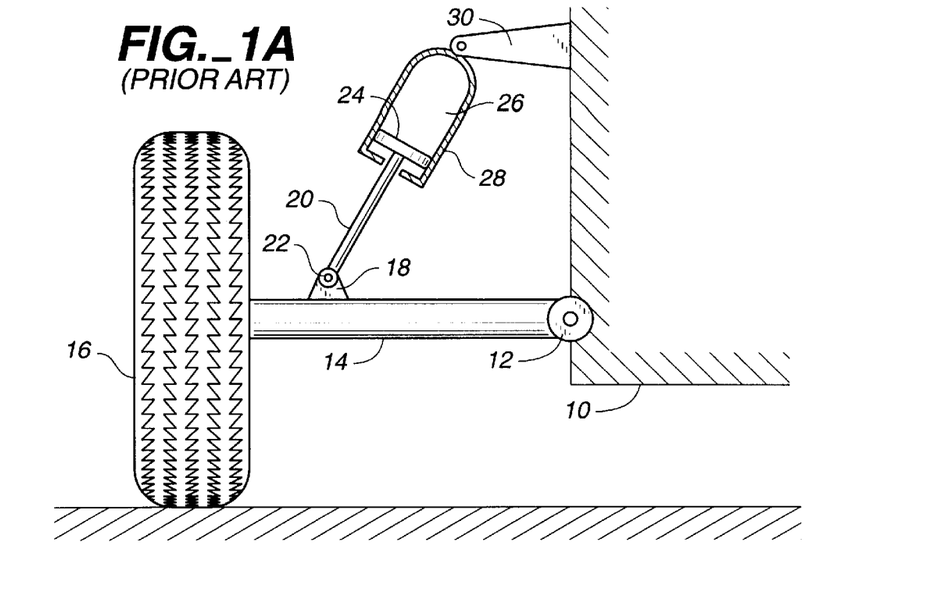
FIG. 1A and FIG. 1B are diagrammatic elevational views in partial cross section illustrating components of a typical prior art shock absorber system associated with an automobile or other wheeled vehicle and illustrating two alternative positions assumed by components of the shock absorber during operation.
Figure 1B:
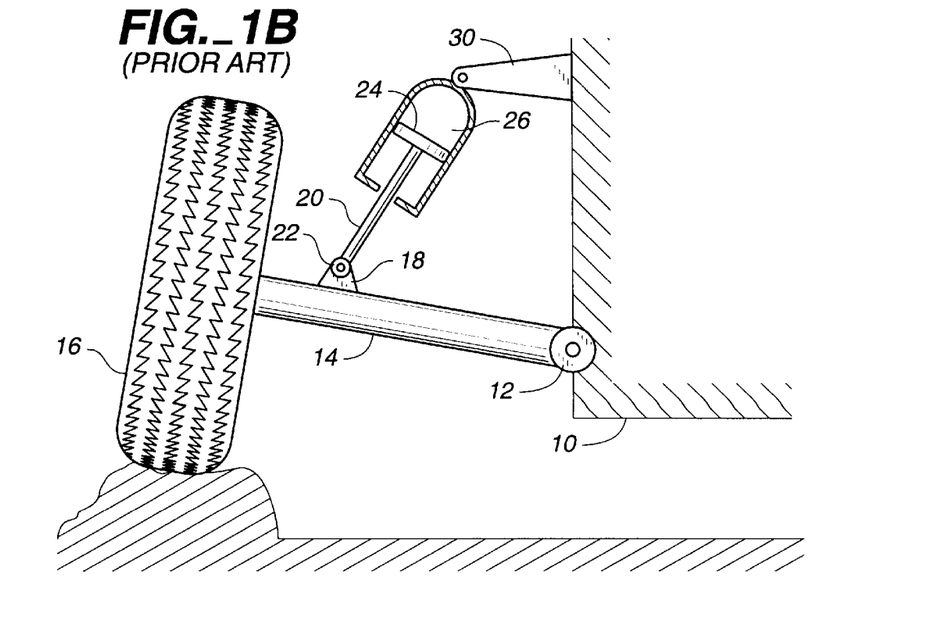

Referring now to FIGS. 1A–1B, a portion of an automobile frame 10 is illustrated. Rotatably connected to frame 10 at a pivot 12 and projecting away from the frame is a wheel support 14 having a wheel 16 rotatably disposed at the distal end thereof. A bracket 18 is affixed to wheel support 14. A shock absorber piston shaft 20 which is straight in the conventional manner, is pivotally attached to bracket 18 by a rotational bushing 22 allowing pivotal movement between the piston shaft and bracket 18. A shock absorber piston head 24 is attached to the distal end of the piston shaft.

The piston head and piston shaft are movable along a linear or straight path of movement within the interior 26 of a shock absorber housing 28. The housing 28 is rotatably journaled with respect to a bracket 30 attached to and projecting from frame 10.

The arrangement just described is typical of that employed in prior art automotive shock absorber systems wherein two relatively pivotally movable structures of the automobile are interconnected by a shock absorber having shock absorber elements which are restricted to relative movement along a substantially straight or linear path. This causes operational problems.

For example, such an arrangement limits the amount of wheel travel during full suspension operation. Also, the rotational bushings employed are subject to degradation and wear. Friction between the relatively movable shock absorber components is also a problem due to the lateral displacement therebetween which necessarily will occur during operation. Damping or shock absorbing response is impeded and vehicle handling characteristics adversely affected.

Prior art vehicular shock absorber systems are also generally characterized by the fact that they require a relatively large operational space and higher weight than one might desire, both factors placing unnecessary limitations on vehicle design and performance; for example, traditional linear shock absorbers may limit the width of wheels that may be employed or require an exceptionally capacious body or structure wheel cavity.

Figure 1C:
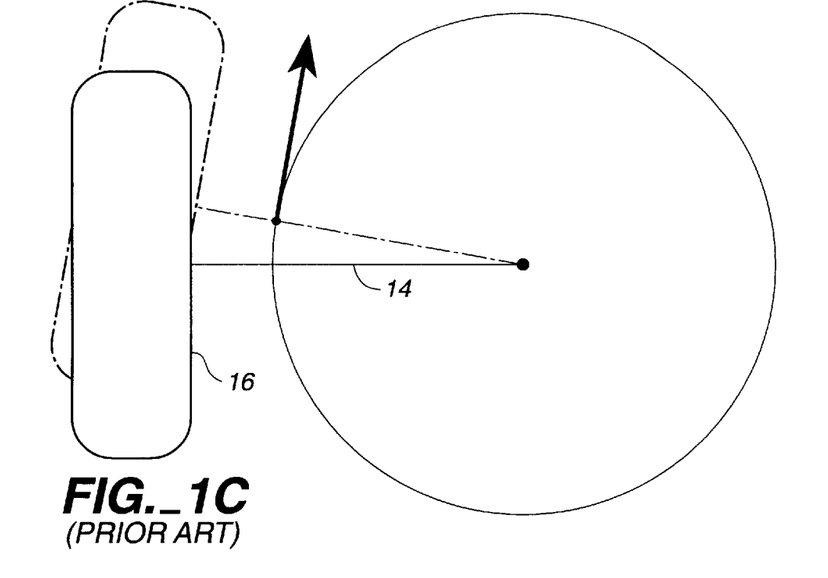
FIG. 1C is a schematic illustration illustrating operation of a prior art shock absorber such as that illustrated in FIGS. 1A, 1B.

FIG. 1C provides a simplified schematic illustration of a typical prior art linear shock absorber system in which the pivotally mounted wheel support 14 moves through the arc of a circle during upward or downward displacement relative to the vehicle frame. On the other hand, movement of the shock absorber piston and shaft is along the straight line represented by the bold arrow in FIG. 1C.

Referring now to FIGS. 2A–2C and 3, a shock absorber constructed in accordance with the teachings of the present invention is illustrated. In this case, a shock absorber 40 includes a damper or shock absorber housing 42 which defines a curved damper housing interior 44. One end, the upper end, of housing 42 is attached to automobile frame 10 by a bracket 46 and a threaded connector including a bolt 48 and a nut 50.

Extending into the curved damper housing interior 44 through an opening in the damper housing is a curved piston shaft 52 having a piston head 54 connected thereto. At its lower end, the curved piston shaft 52 is fixedly connected to wheel support 14 by a bracket 56 and associated threaded connector including a nut and bolt. Means other than the brackets and threaded connectors may be employed to affix the shock absorber housing and shaft to their respective associated structural members, e.g., welding. Also rubber or other means of bushing can be used at attachment points.

Figure 2A:
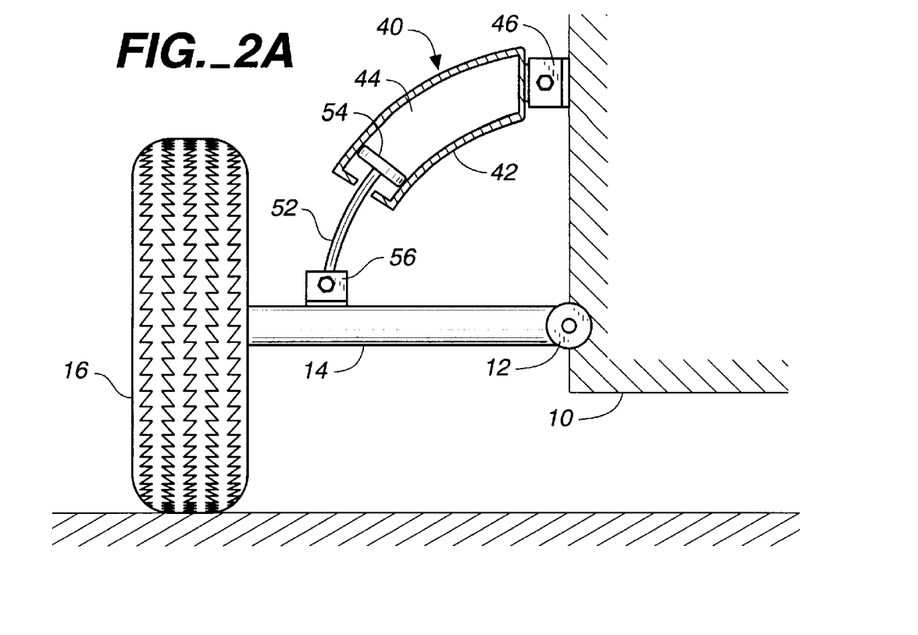
FIGS. 2A–2C are views similar to FIGS. 1A–1C, but illustrating a shock absorber constructed in accordance with the teachings of the present invention.
Figure 2B:
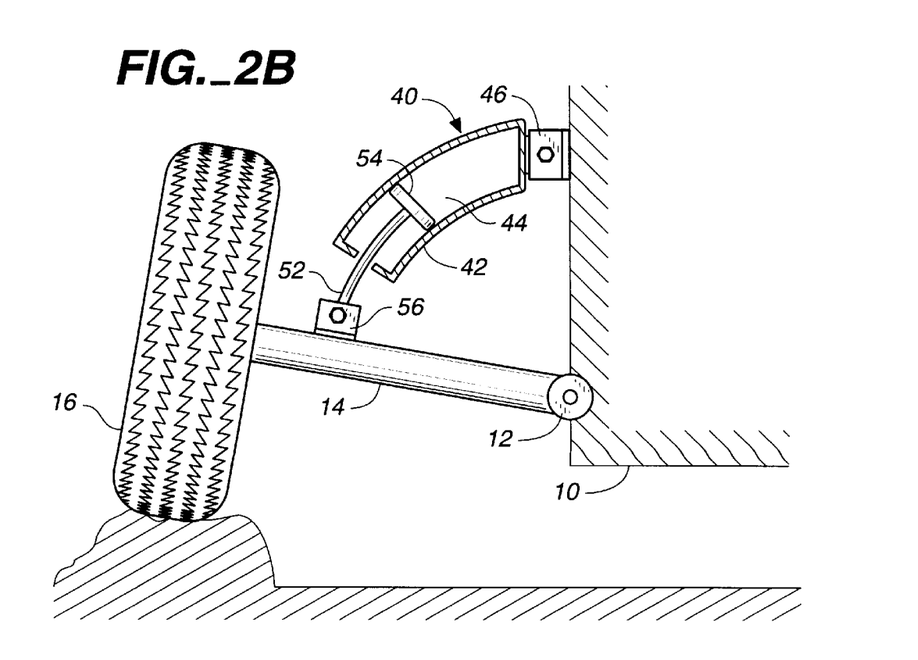
Figure 2C:
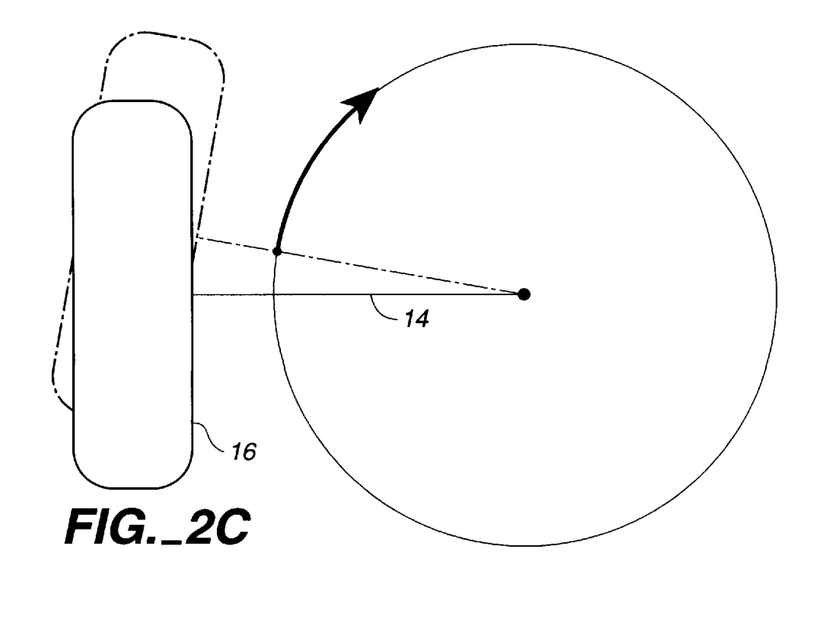
Figure 3:
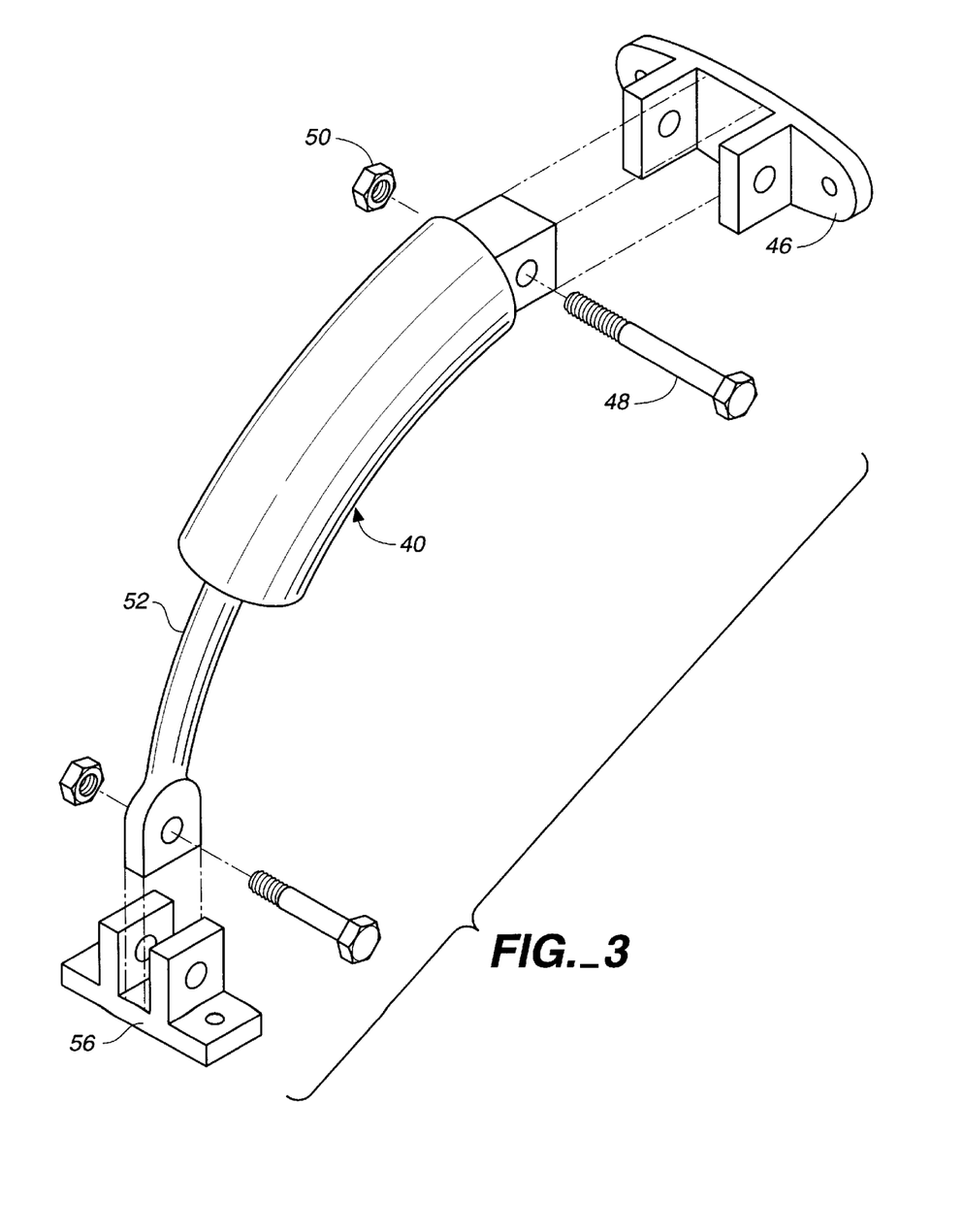
FIG. 3 is an exploded perspective view of structural components of the shock absorber constructed in accordance with the teachings of the present invention and related structure.

FIG. 2A illustrates the shock absorber components in the relative positions assumed thereby when the wheel 16 is on a flat surface such as a roadway. However, when the wheel engages a bump or other object on the roadway, it will rise and move the curved piston shaft and piston head further into curved damper housing interior 44. During such movement, the location on wheel support 14 where the curved piston shaft is attached to the wheel support will follow an arc-shaped course of motion as depicted by the bold arrow in FIG. 2C. The curved piston shaft is movable within the curved damper housing interior along a curved path of movement. The curved piston shaft, the curved damper housing interior, and the curved path of movement are coincident with the arc-shaped course of motion of the location of interconnection between the curved piston shaft and the wheel support. More particularly, the curve of the piston shaft, the damper housing interior and the path of movement is a radial curve; that is, the curve is part of a constant radius circle having its center at the pivot 12.

A number of positive results arise out of such construction. As compared with conventional linear shock absorber constructions, there may be increased wheel travel along the path of suspension movement. The shock absorber follows suspension at all points of travel. Furthermore, there is an elimination of rotational bushings from the shock absorber where the shock absorber is connected to the relatively moving structural members. Thus, there is no bushing maintenance or wear at such locations.

Friction is minimized in the shock absorber since there is virtually zero lateral displacement force occurring between the relatively moving shock absorber structural components. This reduces stress and lengthens shock absorber life. A faster damping response results from the fact that there is essentially no lateral displacement at the upper and lower mounting points.

The shock absorber of the present application will enhance vehicle handling characteristics, providing quicker suspension response between the driver and the road, hence improved control and safety. Improved comfort and lowered noise levels are other resultant advantages, with minor road irregularities being damped more effectively.

Use of the shock absorber of the present invention lowers overall shock absorber assembly height, increasing the space available above the upper shock mounting point. The shock absorber can accommodate a wider wheel since the shock absorber's lower mounting point can be placed within the wheel cavity. The vehicle design may be made more compact. Unlike the linear damper structure of prior art shock absorbers which rest loosely (via rotational bushings) on upper and lower mounting points, the shock absorber of the present invention is mounted solidly on the vehicle chassis; hence, weight of the shock absorber is reduced from the suspension assembly.

Figure 4A:
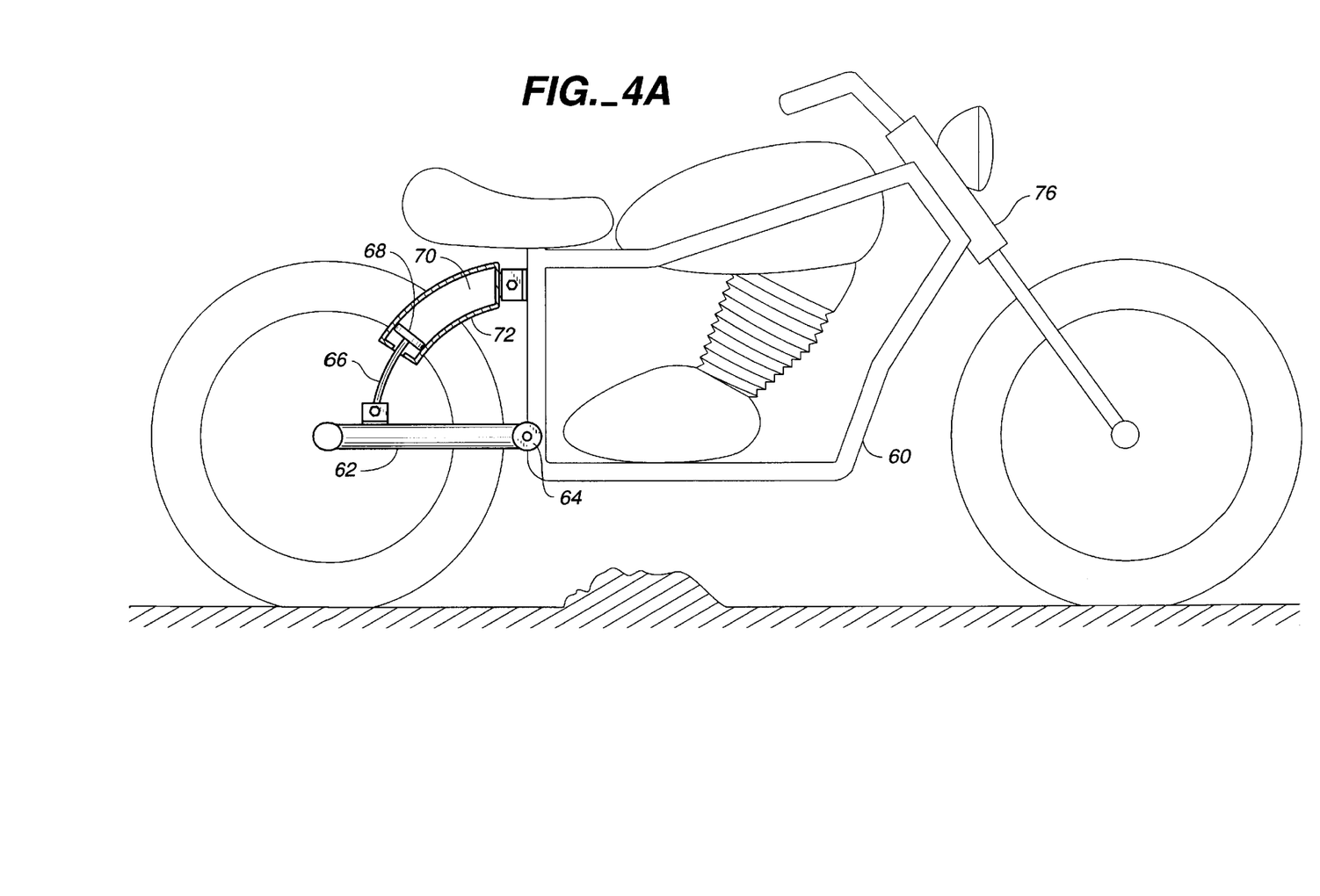
FIGS. 4A and 4B are diagrammatic elevational representations of a motorcycle incorporating a shock absorber constructed in accordance with the teachings of the present invention operatively associated with the rear wheel support of the motorcycle and illustrating components of the shock absorber in alternative relative positions.
Figure 4B:
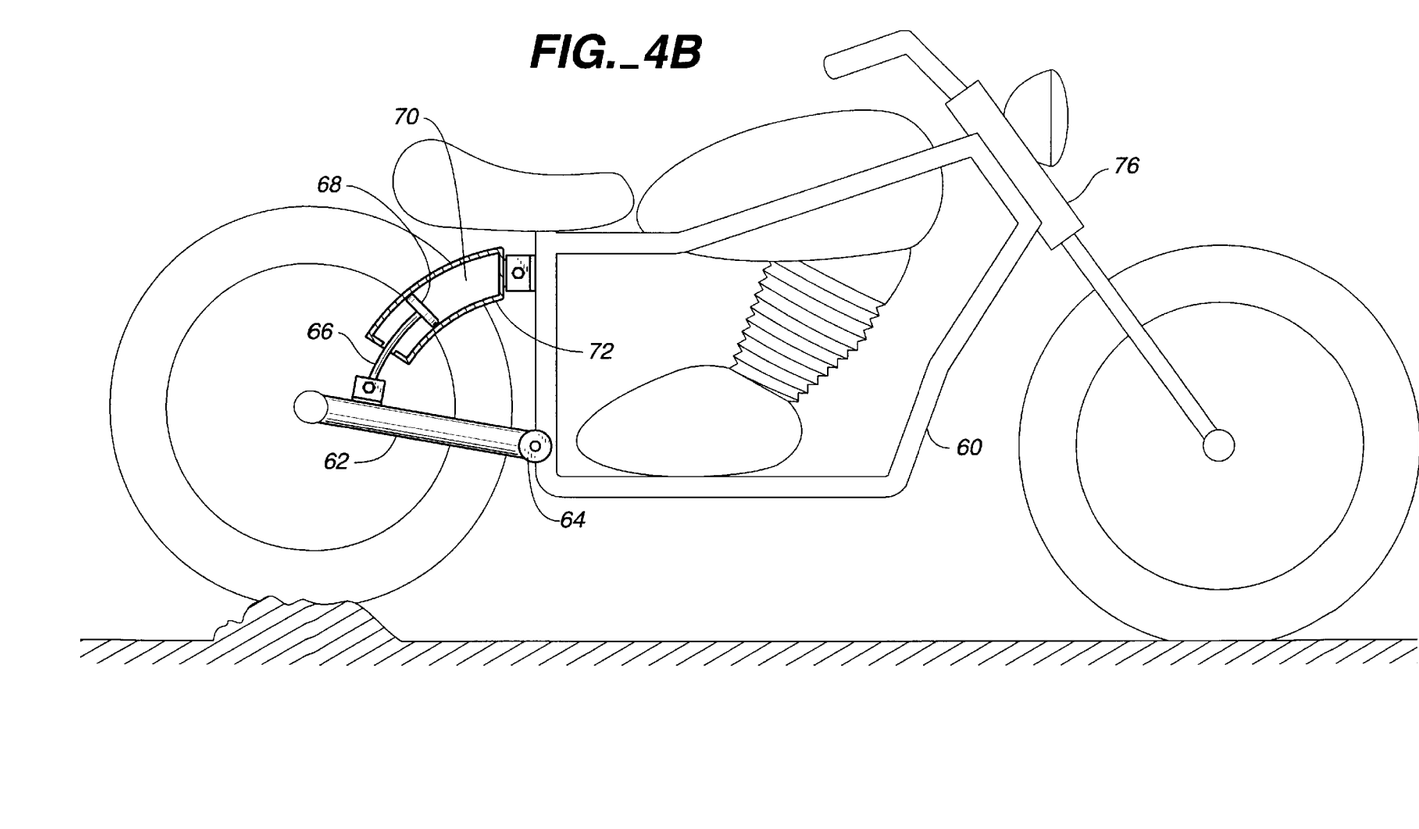

FIGS. 4A and 4B illustrate a motorcycle incorporating a shock absorber constructed in accordance with the teachings of the present invention. The motorcycle includes a motorcycle frame 60. A rear motorcycle wheel support 62 is pivotally connected to frame 60 by a pivot 64 including a rotational bushing. Fixedly connected to rear motorcycle wheel support 62 and projecting upwardly therefrom is a curved piston shaft 66 having a piston head 68 attached to the distal end thereof.

The curved piston shaft and piston head are moveable within the curved damper housing interior 70 defined by damper housing 72. The damper housing 72 is attached to motorcycle frame 60 by a bracket or other suitable expedient. The curve of the piston shaft 66 and the damper housing is a radial curve; that is, the curve is part of a constant radius circle having its center at pivot 64.

This form of the invention cooperates with the motorcycle in essentially the same manner that the above-described shock absorber employed for automotive use cooperates with the automobile with which it is associated. FIG. 4A shows the condition of the shock absorber and associated motorcycle structure just prior to engagement by the rear motorcycle wheel with a protrusion extending from the roadway. FIG. 4B shows the situation when the rear wheel has engaged the protrusion and is moved upwardly.

Figure 5:
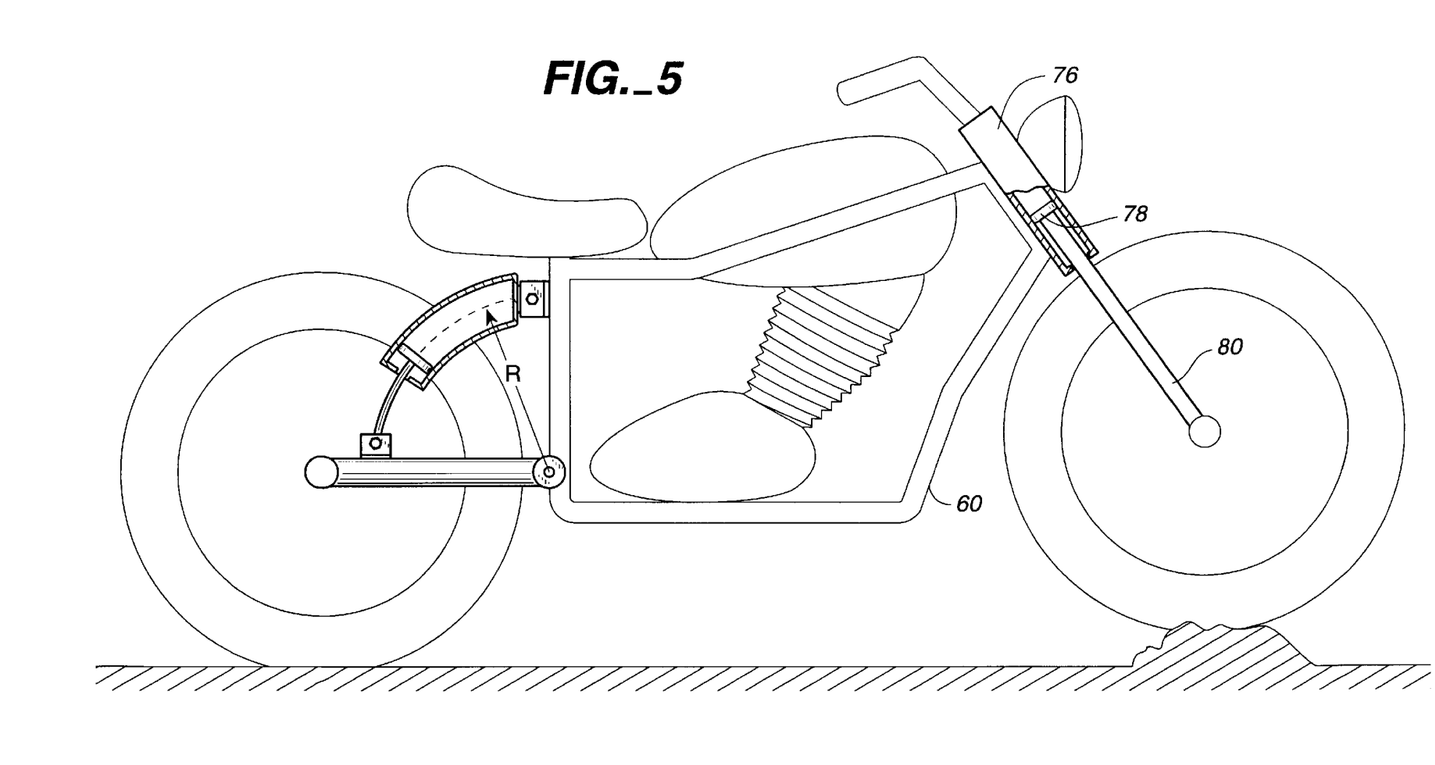
FIG. 5 illustrates the motorcycle of FIGS. 4A, 4B engaging a protrusion on the roadway at the front wheel thereof.

The motorcycle illustrated in FIGS. 4A, 4B is also shown in FIG. 5. Such motorcycle incorporates a standard front wheel support or suspension system including a conventional front telescoping fork tube system, including fork tubes, only of which, fork tube 76 is illustrated. In FIG. 5 a portion of the illustrated fork tube structure 76 is broken away to illustrate a piston head 78 which is slidably moveable within the interior of the tube or housing and a piston shaft 80 which comprises a continuation of the front wheel support.

As may be seen in FIG. 5, the piston head and piston shaft are linearly moveable relative to the housing or fork tube 76 upwardly and inwardly toward the frame when the front wheel of the motorcycle encounters a raised object on the roadway. This is a classic, well-known linear suspension design. In such an approach, the upward movement (compression) of the front suspension results in reduced rake (angle of the forks relative to true vertical), reduced wheelbase (distance between first rear wheels), reduced turning radius, high speed wobble and lateral loading of the fork tubes. This presents an unstable and potentially dangerous situation.

Figure 6A:
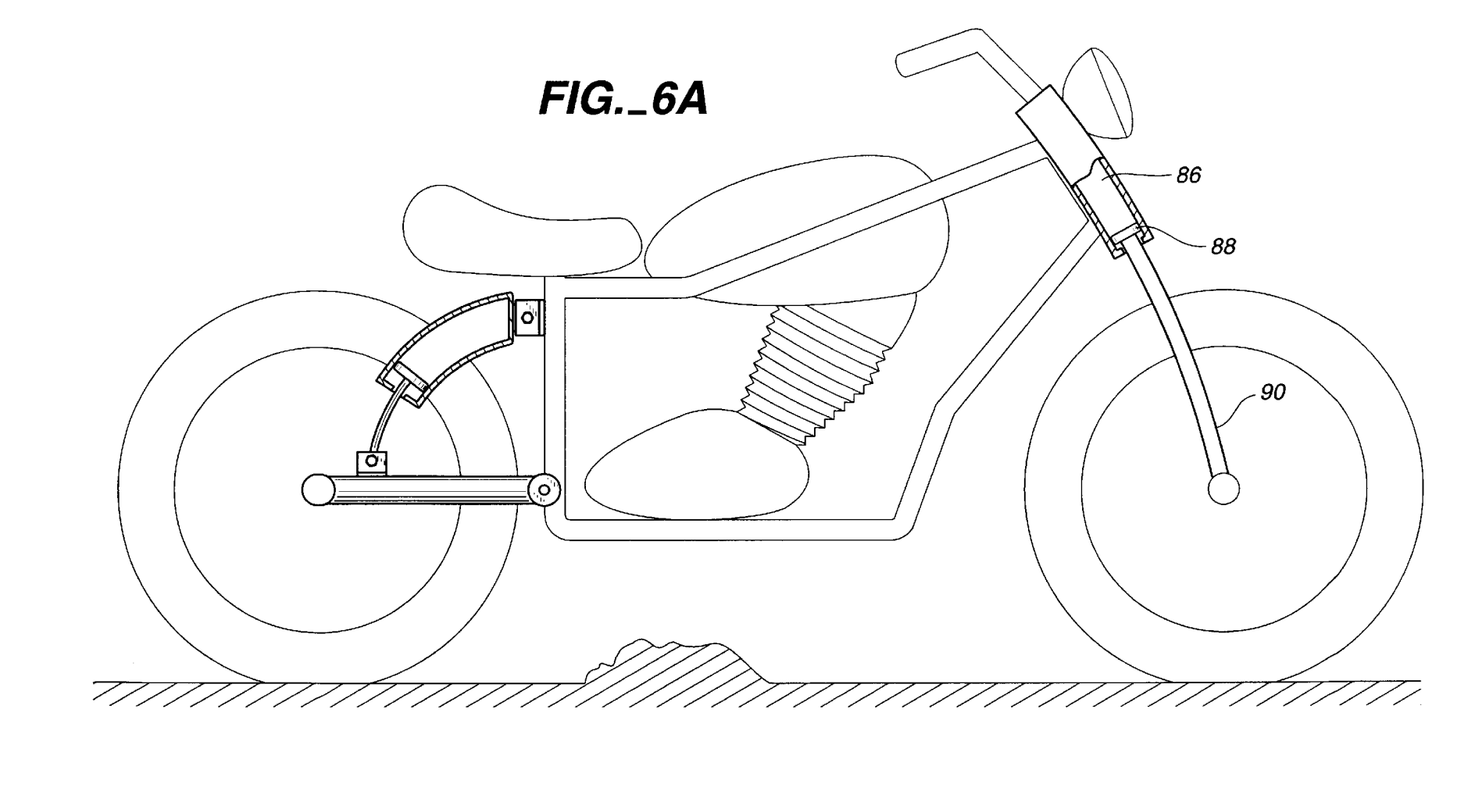
FIGS. 6A, 6B are diagrammatic elevational views illustrating a motorcycle employing shock absorbers constructed in accordance with the teachings of the present invention at both the front and rear of the motorcycle under different operative conditions.
Figure 6B:
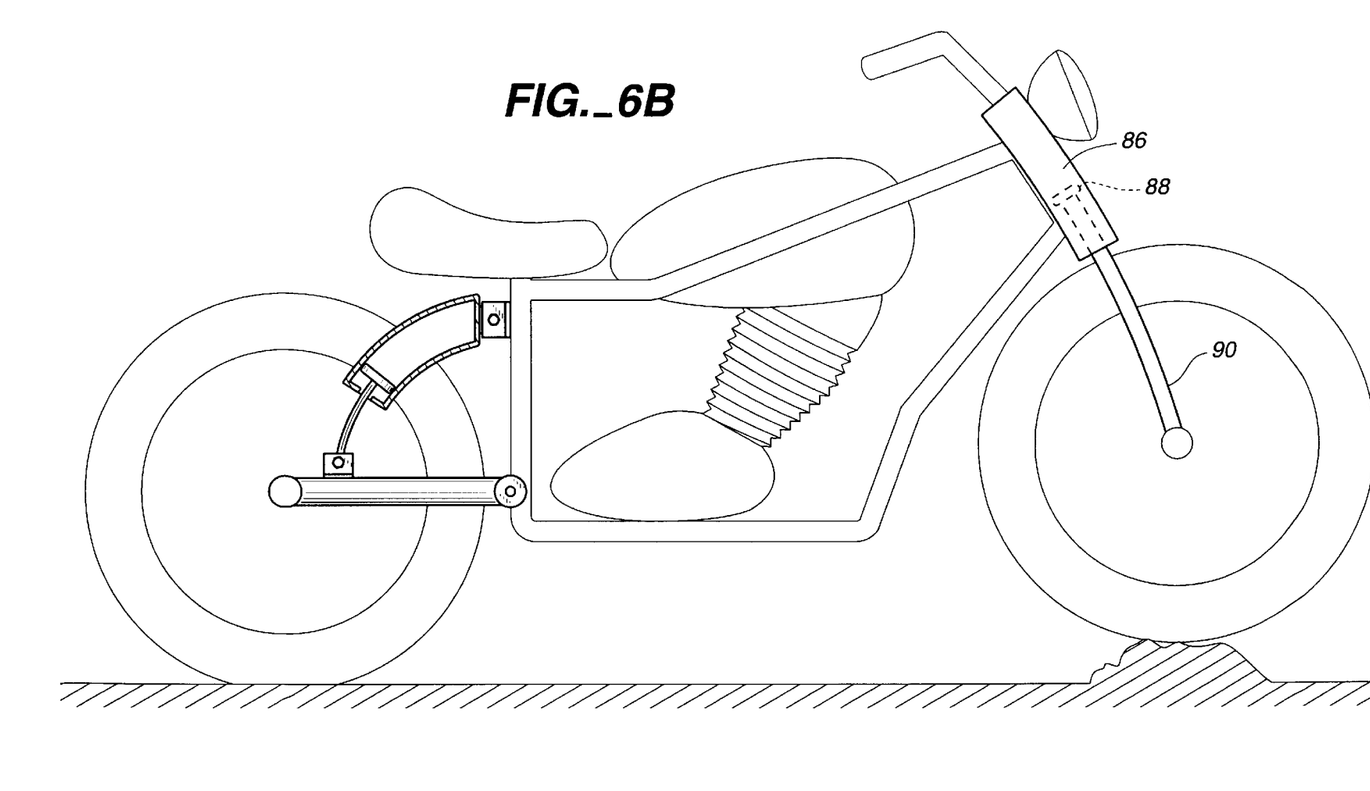

FIGS. 6A and 6B illustrate a motorcycle incorporating a shock absorber or damper constructed in accordance with the teachings of the present invention in association with the front motorcycle wheel suspension. In this arrangement the fork tube or housing 86 defines a curved damper housing interior accommodating a piston head 88 and a curved piston shaft 90 extending to the front wheel axis. FIG. 6A shows the normal relative positions assumed by the structural components when the motorcycle front wheel is on a smooth, flat surface. FIG. 6B illustrates the situation when the front wheel encounters an obstruction on the roadway and is forced upwardly. The curved piston shaft and piston head will move along the curved damper housing interior as the wheel is deflected upwardly.

Figure 7:
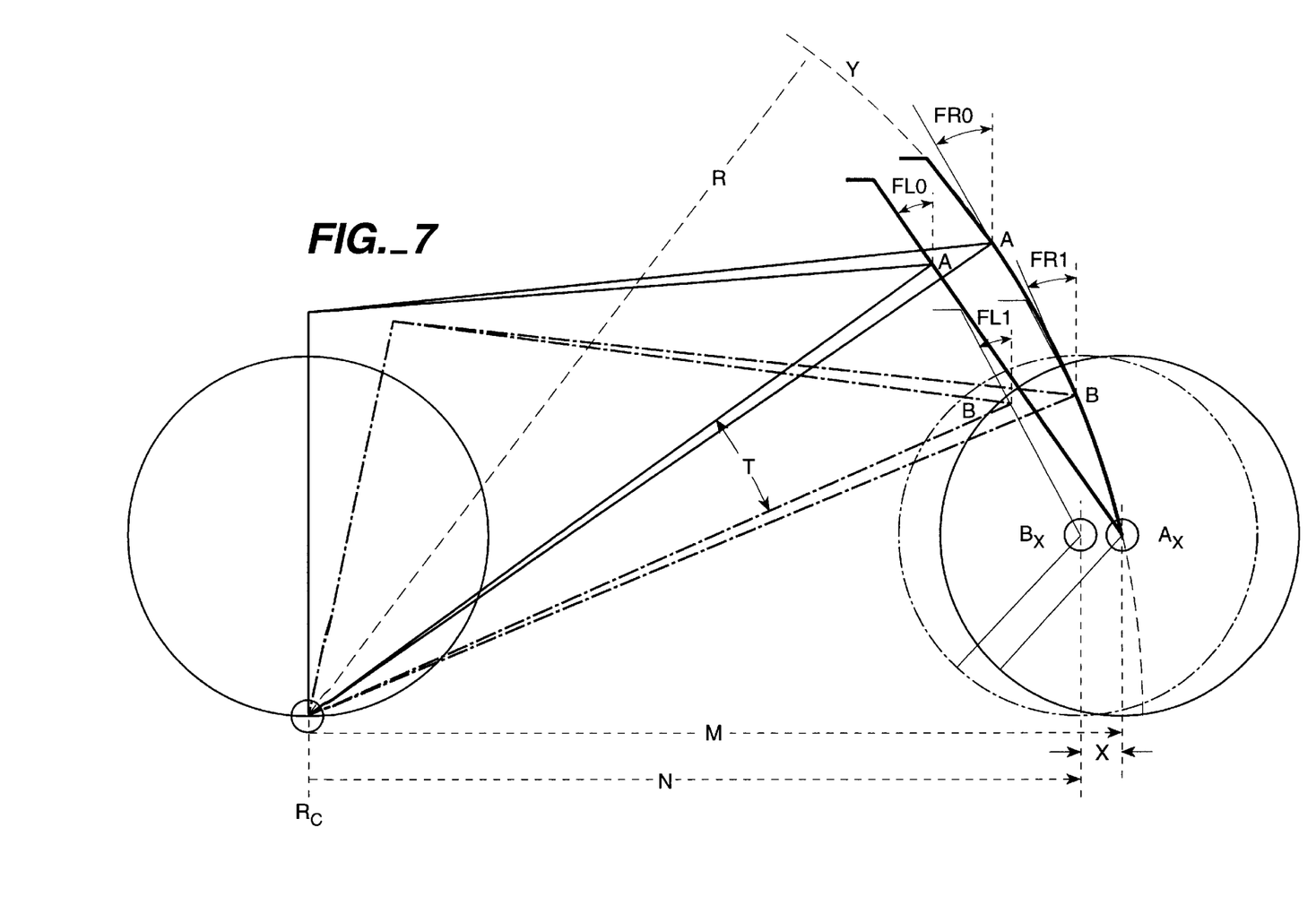
FIG. 7 is a schematic view of components of the motorcycle of FIGS. 6A, 6B illustrating operational characteristics of the motorcycle and associated shock absorbers.

Referring now to FIG. 7, the operation of the front suspension system incorporating shock or damper apparatus constructed in accordance with the teachings of the present invention is illustrated schematically. In FIG. 7, the legend FLO refers to the rake angle of a linear prior art suspension under static load. FL1 designates the rake angle of a linear suspension under compression load. Rc depicts the forward rotation center point. M designates a linear suspension, preload wheel base. N designates a linear suspension, compression load wheel base. X is the wheel displacement, or wheel base reduction, that occurs in linear suspensions when placed under load. And T indicates chassis travel under load in linear suspensions.

Utilizing the front suspension incorporating the damper or shock absorber of the present invention, the rake is maintained at a relative constant value over suspension travel range since the curve of the piston shaft and that of the damper housing interior are co-incident with arc Y of radius R, centered on Rc. The course of motion of the front wheel is coincident with arc Y. By contrast, under compression, the prior art linear suspension approach reduces the rake angle from FLO at rest to FL1 under compression. On the other hand, a suspension system incorporating the teachings of the present invention provides a generally constant rake angle over the normal suspension travel range.

A constant wheel base is also provided by employing the teachings of the present invention. Since the natural movement of the front wheel is an arc (arc Y of radius R centered on at Rc) a standard prior art linear suspension system will result in a reduced wheel base. With the present invention a constant wheel base is provided over the entire suspension travel range, producing an "Anti-Dive" effect.

A reduced wheel base proportionally reduces the turning radius by the distance X in FIG. 7. Such reduction will not occur utilizing the teachings of the present invention. A constant turning radius is maintained over the entire suspension travel range.

Utilizing the teachings of the present invention there also is effective reduction of high speed steering oscillation, commonly referred to as wobble. With variation of the wheel base, the rake angle varies proportionally and reduced rake promotes steering instability. By maintaining a constant rake and constant wheel base through utilization of the teachings of the present invention wobble and steering oscillation over suspension travel range is greatly reduced or eliminated.

The present invention also provides for the substantial elimination of friction and "stiction" in the front suspension. Since the natural movement of the front wheel under forward weight transfer is an arc (arc Y of radius R, centered at Rc), a standard linear suspension will generate friction and "stiction" load between relatively movable damper components thereof. The shock absorber or damper of the present invention, on the other hand, allows virtually friction free relative movement of damper structure over the suspension travel range, improving damping response and handling characteristics.

As a motorcycle traveling at speed approaches a turn, brakes are often applied to reduce speed (causing forward weight transfer) and steering is applied in the direction of the road turn. Inertia (based on the velocity and combined weight of rider and motorcycle) is transferred in a forward direction. This causes compression of the front suspension and, as a result, wheel base is reduced by the distance X and the steering radius is reduced (M is greater than N) when conventional linear front suspensions are employed. Past a critical steering angle, the high forward weight transfer can result in steering lock-up and loss of steering control, as the suspension (and steering) angle is reduced under forward acceleration force. Corrective action in the form of opposite steering can lead to steering lock-up in the reverse direction. Utilizing the teachings of the present invention, however, a constant wheel base is provided along with a constant steering radius, over the entire travel of the suspension.

I claim:

1. In combination:

a first structural member;

a second structural member pivotally connected to said first structural member about a pivot, said first and second structural members mounted for relative pivotal movement about said pivot; and damper means connected to and extending between said first structural member and said second structural member for damping relative pivotal movement between said first and second structural members about said pivot, said damper means comprising a damper housing defining a curved damper housing interior attached to said first structural member at a location on said first structural member spaced from said pivot and a piston and a curved piston shaft connected to said piston attached to the second structural member at a location on said second structural member spaced from said pivot and movable within said curved damper housing interior along a curved path of movement during relative pivotal movement between said first structural member and said second structural member, said curved piston shaft, said curved damper housing interior and said curved path of movement being disposed in a common plane, and the curve of said curved damper housing interior, the curve of said curved piston shaft and the curve of said curved path of movement being disposed along the arc of a circle having the center thereof at said pivot.

2. The combination according to claim 1 wherein one of said structural members comprises a vehicle frame and the other of said structural members comprises a wheel support pivotally connected to said vehicle frame at said pivot and pivotally movable about said pivot in said common plane, said damper means comprising a vehicle shock absorber.

3. The combination according to claim 2 wherein said curved piston shaft is attached to said wheel support at a location on said wheel support between said pivot and a wheel connected to said wheel support.

4. The combination according to claim 2 wherein said vehicle frame comprises a motorcycle frame.

5. The combination according to claim 4 wherein said wheel support comprises a motorcycle wheel support.

6. The combination according to claim 5 wherein said motorcycle wheel support comprises a rear motorcycle wheel support.

7. In combination:

a first structural member;

a second structural member movable relative to said first structural member; and damper means connected to and extending between said first structural member and said second structural member for damping relative movement between said first and second structural members, said damper means including a curved damper element attached to one of said structural members and a housing having a curved housing interior attached to the other of said structural members, said curved damper element being slidably positioned in the curved housing interior, said curved housing interior and said curved damper element having the same radius of curvature and said curved damper element and said curved housing interior being relatively movable along a curved path of movement coincident with said radius of curvature during relative movement between said first and second structural members, one of said structural members comprising a motorcycle frame having a front frame portion and the other of said structural members comprising a front motorcycle wheel support movable relative to the front frame portion of said motorcycle frame, said motorcycle frame being rotatable about a forward rotation center point, said damper means being attached to said front frame portion and cooperable with said motorcycle frame and said motorcycle wheel support to maintain the wheel base and rake of said motorcycle substantially constant during relative movement between said front motorcycle wheel support and said front frame portion to provide a substantially constant turning radius when said motorcycle frame rotates about said forward rotation center point, one of said curved damper element or said housing comprising an extension of said front motorcycle wheel support and the other of said curved damper element or said housing being mounted on said front frame portion, said curved housing interior, said curved damper element and said curved path of movement being disposed in a common plane, the curve of said curved housing interior, the curve of said curved damper element and the curve of said curved path of movement being disposed along the arc of a circle centered at said forward rotation center point.

* * * * *